United States Patent
Unnerstall et al.

(10) Patent No.: US 10,575,179 B2
(45) Date of Patent: Feb. 25, 2020

(54) SYSTEM AND METHOD FOR DEVICE FRAUD PREVENTION

(71) Applicant: MASTERCARD INTERNATIONAL INCORPORATED, Purchase, NY (US)

(72) Inventors: Rick Unnerstall, O'Fallon, MO (US); Corey M. Hively, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 20 days.

(21) Appl. No.: 15/365,261

(22) Filed: Nov. 30, 2016

(65) Prior Publication Data

US 2018/0152845 A1    May 31, 2018

(51) Int. Cl.
| | | |
|---|---|---|
| H04W 12/12 | (2009.01) | |
| G06Q 20/32 | (2012.01) | |
| H04L 29/06 | (2006.01) | |
| H04W 12/06 | (2009.01) | |
| H04W 12/04 | (2009.01) | |
| H04M 15/00 | (2006.01) | |

(52) U.S. Cl.
CPC ........ *H04W 12/12* (2013.01); *G06Q 20/3224* (2013.01); *H04L 63/08* (2013.01); *H04W 12/06* (2013.01); *H04L 2463/102* (2013.01); *H04M 15/751* (2013.01); *H04W 12/04* (2013.01)

(58) Field of Classification Search
CPC ..... H04W 12/06; H04W 12/04; H04W 12/12; H04M 15/751
USPC .................................................. 455/410, 411
See application file for complete search history.

(56) References Cited

U.S. PATENT DOCUMENTS

| | | | | |
|---|---|---|---|---|
| 2009/0117883 A1* | 5/2009 | Coffing | ................... | H04W 4/21 455/414.1 |
| 2011/0173684 A1* | 7/2011 | Hurry | ..................... | G06F 21/33 726/6 |
| 2013/0047200 A1* | 2/2013 | Radhakrishnan | ....... | G06F 21/34 726/1 |

(Continued)

FOREIGN PATENT DOCUMENTS

WO    2016046711 A2    3/2016

OTHER PUBLICATIONS

International Search Report with Written Opinion corresponding to International Patent Application No. PCT/US2017/055729, dated Nov. 30, 2017, 13 pages.

*Primary Examiner* — Jaime M Holliday
(74) *Attorney, Agent, or Firm* — Michael Best & Friedrich LLP (57) ABSTRACT

Users may enroll one or more devices based on device information and a resource information associated with a resource. Such information and identifiers may be tokenized according to a hash algorithm to generate an enrolled user token. This enrolled user token may be utilized to verify communications and status changes of the user device. In response to a change of status of the user, similar information as that used to generate the enrolled user token, or at least a portion thereof, may be gathered from the user device and subjected to the same hash algorithm to generate a current user token. The current user token and the enrolled user token may be compared to determine if the user device is a spoofed device.

20 Claims, 4 Drawing Sheets

(56) References Cited

U.S. PATENT DOCUMENTS

| | | | |
|---|---|---|---|
| 2014/0344153 A1* | 11/2014 | Raj | G06Q 20/3821 |
| | | | 705/44 |
| 2015/0038120 A1 | 2/2015 | Larkin | |
| 2015/0227934 A1* | 8/2015 | Chauhan | G06Q 20/4016 |
| | | | 705/44 |
| 2016/0165435 A1* | 6/2016 | Mu | H04W 12/02 |
| | | | 713/169 |
| 2016/0224983 A1* | 8/2016 | Cash | G06Q 20/40145 |
| 2017/0228732 A1* | 8/2017 | Badenhorst | G06Q 20/401 |

\* cited by examiner

SYSTEM AND METHOD FOR DEVICE FRAUD PREVENTION

BACKGROUND

People are increasingly connected to their communications devices, allowing them to perform numerous tasks more easily and quickly. The connections provided by these devices allow users to monitor and manage aspects of their lives that were previously accomplished (and, in some cases, arguably safeguarded) by in-person activities. However, use of these communications devices, including smartphones, tablets, computers, etc., has opened the door to "spoofing" by unwanted persons through manipulating the communications to make it appear as if they were derived from the actual device owner. These spoofed communications can disrupt users' lives through identity theft and fraud.

SUMMARY

Embodiments herein protect against fraud relating to communications devices. More specifically, embodiments envision that each user may enroll one or more communications devices (also referred to as "user devices") based on device information obtained from a user device and a resource identifier (e.g., personal account number) associated with a resource (e.g., a credit or debit card). The device information may be tokenized (and in some instances combined with the resource identifier) according to a hash algorithm to generate an enrolled user token. This enrolled user token may be shared with system components, such as an authenticator, to verify communications and status changes of the user device. For example, when the user device changes location, the information used to generate the enrolled user token, or at least a portion thereof, may be gathered from the user device (and in some instances combined with the resource identifier) then subjected to the same hash algorithm to generate a current user token. The current user token and the enrolled user token may be compared to determine if the user device is a spoofed device, or whether the user device is the same device as during the enrollment process.

In one aspect, a method for device fraud prevention is disclosed. The method may include receiving a user status change associated with a user device. The method may additionally include receiving an enrolled user token, the enrolled user token based upon: registered user device information, registered resource information associated with a resource used by the user, and a hash procedure. The method may also include authenticating the user device in response to receiving the user status change based upon a match between a current user token and the enrolled user token as compared to a predefined threshold, the current user token being based upon current user device information, resource information, and the hash procedure.

In another aspect, a system for device fraud prevention includes a fraud prevention server including a processor in communication with a memory. The memory may store an enrolled user token based on registered user device information, registered resource information, and a hash procedure. The memory may also store a current user token based on current user device information, resource information, and the hash procedure. The memory may further store an authenticator including computer readable instructions that, when executed by the processor, match the enrolled user token with the current user token, as compared to a predefined threshold, to generate at least one of: a location verification when the match is at or above the predefined threshold, a confidence level indicating a relationship between the match and the predefined threshold, and a location alert when the match is below the predefined threshold.

In another aspect, a non-transitory computer readable medium with computer executable instructions stored thereon executed by an issuer processor to perform device fraud prevention includes instructions for generating an enrolled user token based on registered user device information of a user device, a registered resource information of a resource, and a hash procedure. The non-transitory computer readable medium may further include instructions for transmitting said enrolled user token to a fraud prevention server. The non-transitory computer readable medium may further include instructions for receiving an authentication communication based on the enrolled user token and a current user token. The non-transitory computer readable medium may also include instructions for analyzing the authentication communication to authorize a communication associated with the resource.

DETAILED DESCRIPTION OF THE EMBODIMENTS

Embodiments herein provide security for device communications such that a user may conduct sensitive activities, and communications related thereto, via the user's device(s) while implementing an enhanced level of security. The fraud prevention embodiments herein provide a robust system utilizing multiple checks and balances to authenticate communications generated by the user's device. More specifically, embodiments herein combine identifiers from the user's device in association with identifiers unassociated with the user's device, such as resource information, to uniquely authenticate communications derived from the device.

Figure 1:
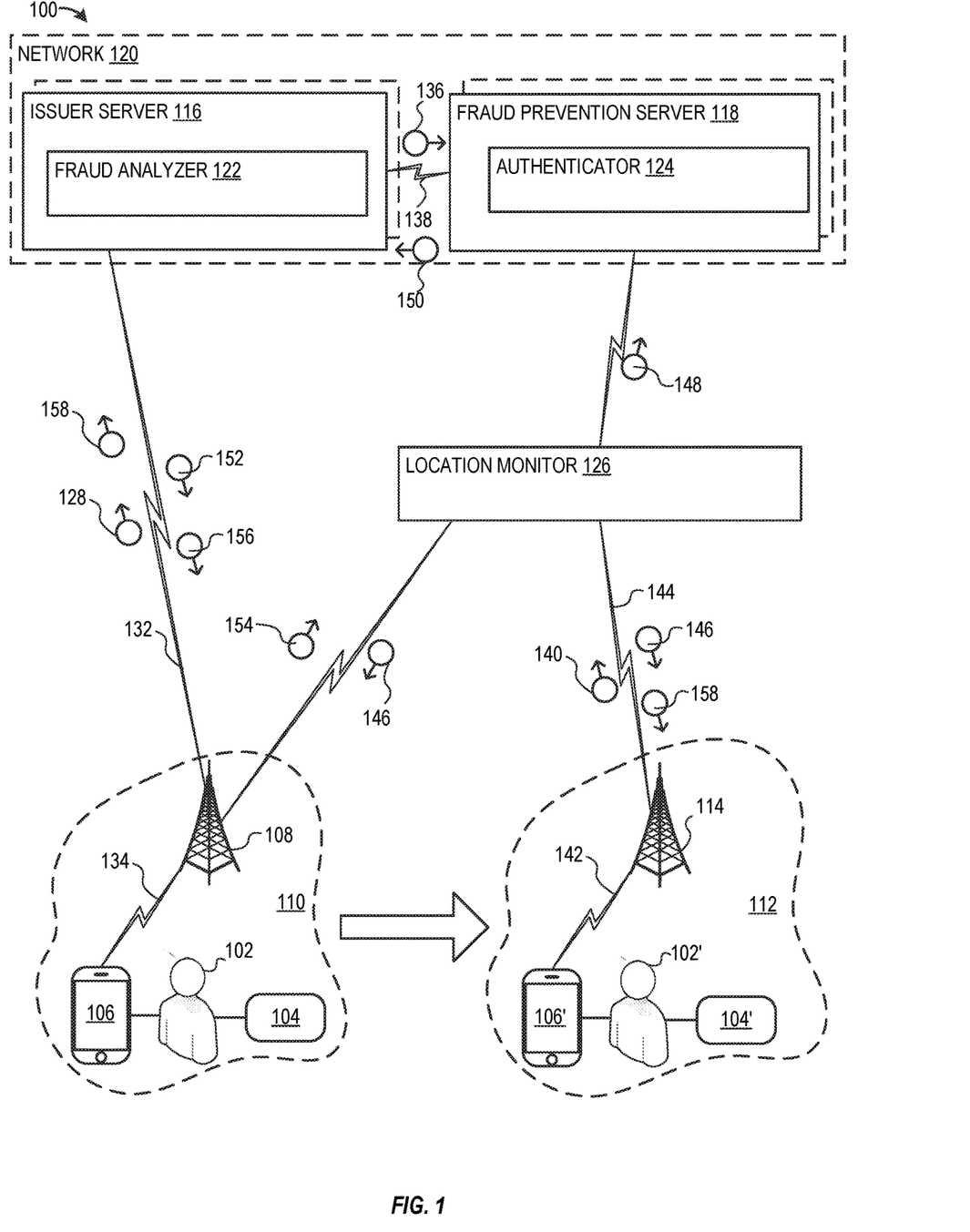
FIG. 1 depicts an exemplary system for device fraud prevention, in embodiments.
Figure 2:
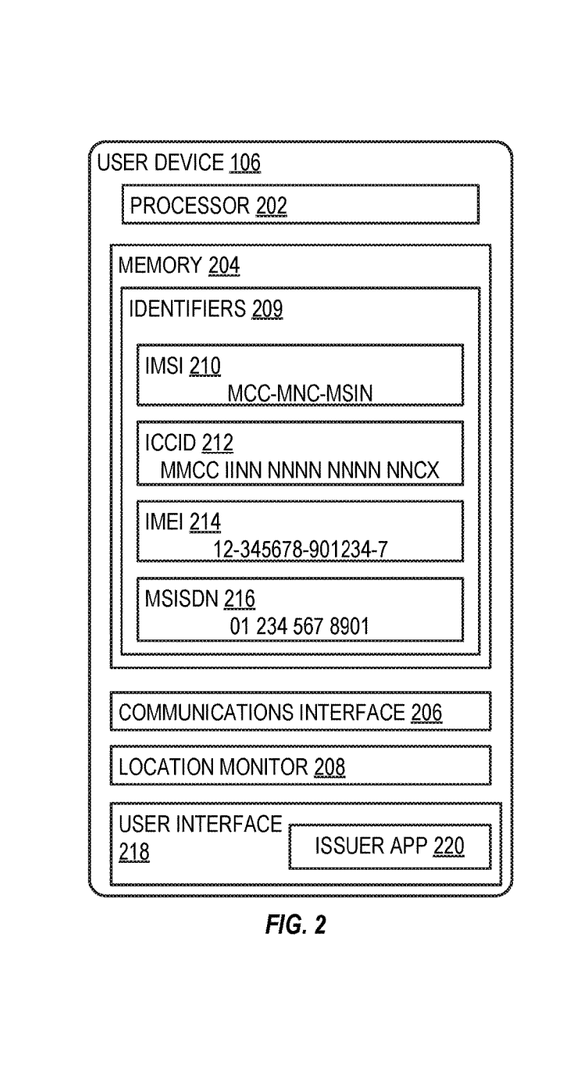
FIG. 2 depicts further details of the user device of FIG. 1, in embodiments.
Figure 3:
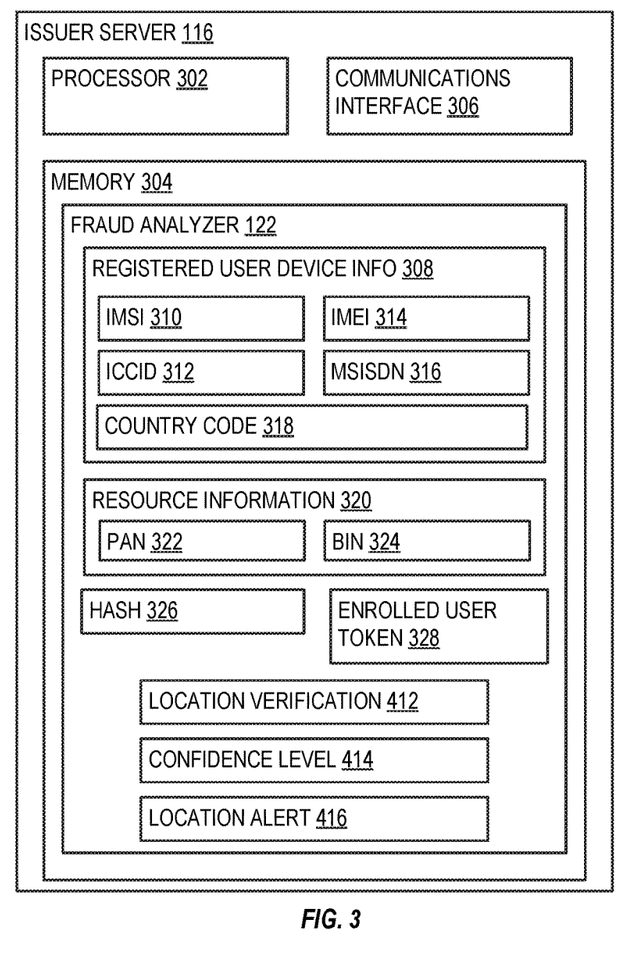
FIG. 3 depicts further details of the issuer server of FIG. 1, in embodiments.
Figure 4:
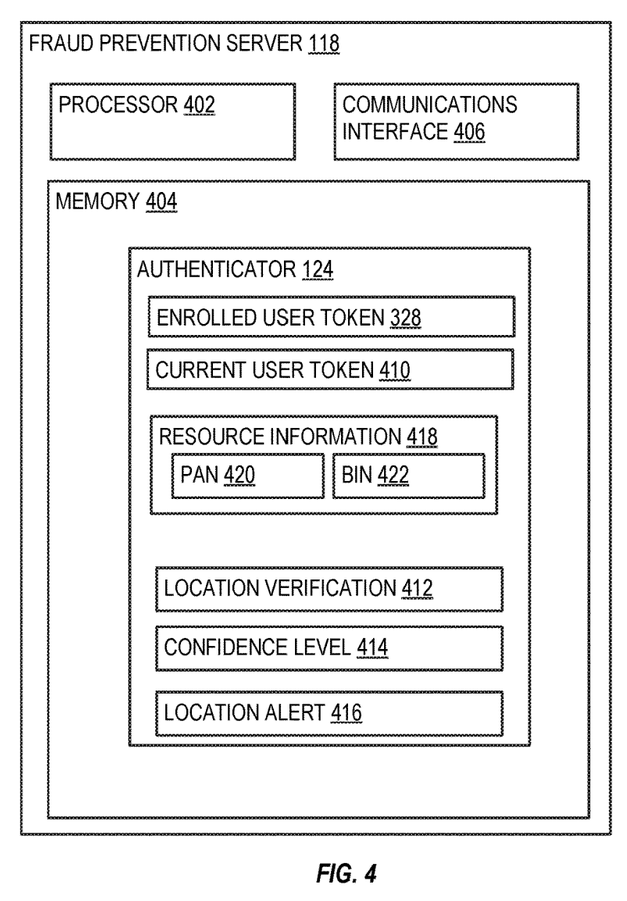
FIG. 4 depicts further details of the fraud prevention server of FIG. 1, in embodiments.
Figure 5:
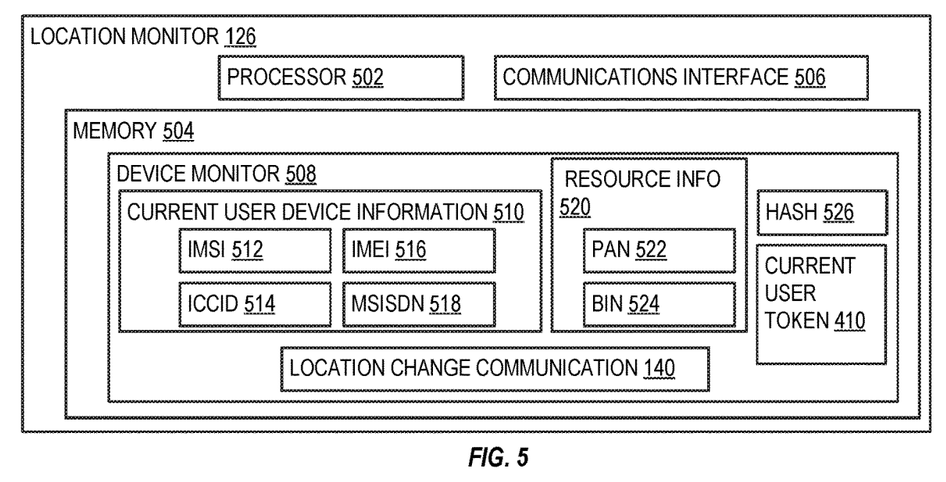
FIG. 5 depicts further details of the location monitor of FIG. 1, in embodiments.

FIG. 1 depicts an exemplary system 100 for device fraud prevention, in embodiments. FIG. 2 depicts further details of the user device 106, of FIG. 1, in embodiments. FIG. 3 depicts further details of the issuer server 116, of FIG. 1, in embodiments. FIG. 4 depicts further details of the fraud prevention server 118, of FIG. 1, in embodiments. FIG. 5 depicts further details of the location monitor 126, of FIG. 1, in embodiments. FIGS. 1-5 are best viewed together with the following description.

System 100 provides device fraud prevention for communications generated by a user device. As shown in FIG. 1, a user 102 has an associated resource 104 and user device 106. Resource 104 represents a credit card, debit card, charge card, prepaid card, gift card, bank account, PayPal, electronic transfer funds account, or any other resource that may be used by the user to implement a transaction, as well as digital resource systems such as ApplePay, Google Wallet, and the like.

User device 106 represents a computer, mobile device, smartphone, tablet, laptop, or any other device capable of interacting with the user to control aspects associated with resource 104 as discussed in further detail below. User device 106 may be in communication with antenna 108 to provide network access for user device 106. Network access may be wired access, or wireless such as WiFi, cellular, or any other wireless communications protocol. Antenna 108 may be any antenna or other electronic system associated with such wired or wireless communications protocol that enables communications between user device 106 and another component within system 100. User device 106 may be operated by user 102 in a first area 110. First area 110 may be referred to as a "home" location in which the user device 106 is typically operated by user 102. In embodiments, where user device 106 is a smartphone, first area 110 may represent an area code or other geo-fence in which the user 102 has a mobile service contract set up and which the mobile service identifies as the user's 102 home location.

User 102 may travel between a first area 110 and a second area 112. Therefore, user 102' represents user 102 after travelling to second area 112. Moreover, when user 102 travels to second area 112, the user often will carry his or her user device 106 and resource 104 to communicate and perform transactions, respectively. Therefore, resource 104' in FIG. 1 represents resource 104 after travel to second area 112. Similarly, user device 106' represents user device 106 after travel to second area 112.

Resource 104 may be managed by an issuer server 116. Issuer server 116 may cooperate with a fraud prevention server 118 to enable and authenticate transactions between user 102 and merchants (not shown) located in first area 110, second area 112, or any other area, using resource 104. Issuer server 116 may represent a bank or other entity that issues resource 104 to user 102. Issuer server 116 may represent a single server, or a network of multiple servers without departing from the scope hereof Communications to and from issuer server 116 may be completed over a wired or wireless connection (for example, using a communications interface of the issuer server 116) as described in further detail below. Fraud prevention server 118 may similarly represent a single server, or a network of multiple servers without departing from the scope hereof. Also, communications to and from fraud prevention server 118 may be completed over a wired or wireless connection using a communications interface of the fraud prevention server 118, as described in further detail below.

Fraud prevention server 118 may be operated by a resource association (not shown), such as MasterCard®, Visa®, American Express®, Discover Card®, and Diners Club® etc. As such, resource 104 is issued by the issuer server 116, and associated with a resource association. For example, where issuer server 116 is operated by Bank of America® and the resource association is MasterCard®, resource 104 would be a Bank of America® issued MasterCard®.

It should be appreciated that issuer server 116 and fraud prevention server 118 may be a part of a network 120. Network 120 within FIG. 1 may represent a four party scheme, where (1) issuer server 116 operates to communicate with each user (e.g. user 102) associated with resources (e.g. resource 104) issued by the issuer server 116, and (2) a merchant acquirer (not shown), which is a separate entity from the issuer server 116, operates to communicate with each merchant (not shown) that the resources (e.g. resource 104) may be used at. It should be appreciated that network 120 may operate as a three party scheme, where issuer server 116 and the merchant acquirer are a single entity (e.g. American Express®, Discover Card®, and Diners Club®).

Issuer server 116 may include a fraud analyzer 122 to analyze potential fraud associated with resource 104 and authenticate transactions using resource 104. Additional details of fraud analyzer 122 are discussed below. Fraud prevention server 118 may include a location based authenticator 124 for authenticating resource 104 when user 102 travels to second area 112. For example, authenticator 124 may utilize location details of user device 106, 106' obtained from location monitor 126 to authenticate, or at least partially authenticate, user 102' when located in second area 112. Additional details of authenticator 124 are discussed below.

Location monitor 126 may be a third party location monitor, such as Syniverse®, that monitors antenna 108, 108' (and other antenna within the network supported thereby) to identify changes in location of user device 106 between first area 110 and second area 112. In certain embodiments, location monitor 126 need not be a third party entity, but instead may be a GPS module associated with user device 106 that transmits location information directly to fraud prevention server 118.

Turning now to FIG. 2, in embodiments, user device 106 may include a device processor 202 communicatively coupled with a device memory 204, and a device communications interface 206. In embodiments, user device 106 may further include a location monitor 208.

Device processor 202 represents one or more digital processors that execute computer readable instructions stored within memory 204 to implement functionality of user device 106 discussed herein.

Device memory 204 may be transitory and/or non-transitory and represents one or more of volatile memory (e.g. RAM) and non-volatile memory (e.g. ROM, FLASH, magnetic media, optical media, and so on). In certain embodiments, device memory 204 may be removable from user device 106, for example as a SIM card. Device memory 204 may store one or more identifiers 209 associated with device 106. For example, memory 204 may store an International Mobile Subscriber Identity ("IMSI") 210, an Integrated Circuit Card Identification ("ICCID") 212, an International Mobile Equipment Identity ("MEI") 214, and a Mobile Station International Subscriber Directory Number ("MSISDN") 216.

IMSI 210 may be a unique identifier that defines user 102 in the wireless "world." For example, the IMSI 210 may identify the country and mobile network to which the user 102 belongs. IMSI 210 is shown with a format MCC-MNC-MSIN. MCC may represent the country code (e.g. 310 for the United States of America). MNC may represent the Mobile Network Code (e.g. 410 for AT&T). MSIN may represent a sequential serial number (for example 1234). IMSI 210 may serve as an identifier of user 102 when user device 106 transmits and receives signals and/or messages via communications interface 206.

ICCID 212 identifies a SIM card of user device 106. For example, the ICCID 212 may identify memory 204. In embodiments, the ICCID may not be alterable within memory 204, whereas other identifiers 210, 214, and 216 may be modified based on the specific user 102, antenna 108, etc. MM may be a constant identifying the major industry identifier according to ISO 7812. CC may be the country code. II may be an issuer identifier. The 12 "N's"

represent the account ID. And C is a checksum calculated from the other 19 digits using a Luhn Algorithm. The X may be an extra 20$^{th}$ digit returned by an "AT!ICCID?" command but may or may not be included as part of the ICCID 212.

IMEI 214 may be a unique number associated with the user device 106.

MSISDN 216 may be the full phone number associated with the user 102.

Communications interface 206 represents one or more receiver(s), transmitter(s), and transceiver(s) and other communication systems allowing communications to be transmitted and/or received by user device 106 between other components of system 100.

In embodiments including location monitor 208, location monitor 208 may determine the location of user device 106. For example, location monitor 208 may take place of the location monitor 126 of FIG. 1 such that location information determined by location monitor 208 is relayed to fraud prevention server 118.

In embodiments, user device 106 may further include a user interface 218 for interacting with user 102. For example, user interface 218 may include one or more of a display, an audio output, an input such as a touch screen or other buttons, microphone, etc. for receiving input from user 102. User interface 218 may display an issuer application 220. Issuer application 220 may be a Software Development Kit (SDK) implemented as computer readable instructions stored within memory 204 that when executed by processor 202 interact with user 102 to one or more of 1) enroll user device 106 and 2) prompt user 102 of the status of determinations made by fraud analyzer 122, as discussed in further detail below. Issuer application 220 may be downloaded to user device 106 from issuer server 116. The enrollment process described herein may be initiated by issuer server 116 transmitting an enrollment prompt 152 to interact with user 102, via issuer application 220, to enroll for geo-location based fraud prevention. Enrollment prompt 152 may be relayed by antenna 108 using a first communication link 132 between antenna 108 and issuer server 116 and a second communication link 134 between user device 106 and antenna 108.

Turning to FIG. 3, issuer server 116 may include an issuer processor 302 communicatively coupled with issuer memory 304 and a communications interface 306.

Issuer processor 302 represents one or more digital processors that execute computer readable instructions stored within memory 304 to implement functionality of issuer server 116 discussed herein.

Issuer memory 304 may be transitory and/or non-transitory and represents one or more of volatile memory (e.g. RAM) and non-volatile memory (e.g. ROM, FLASH, magnetic media, optical media, and so on). Issuer memory 304 is shown storing a fraud analyzer 122.

Fraud analyzer 122 represents computer readable instructions that, when executed by processor 302, enable issuer server 116 to analyze potential fraud associated with user 102 and one or both of user device 106 and resource 104. Fraud analyzer 122 may operate to enroll a specific user 102 and its user device 106 for authentication by an authenticator of fraud prevention server 118, discussed in further detail below.

Referring to FIG. 1, fraud analyzer 122 may receive, via a communication 128 between user device 106 and issuer server 116, identifiers 209 (FIG. 2) regarding user device 106. As shown in FIG. 1, communication 128 may be transmitted from user device 106 using first communication link 132 and second communication link 134. Fraud analyzer 122 interacts with user 102 for activities related to resource 104. In certain embodiments, fraud analyzer 122 may verify transactions proposed using resource 104 based on information provided from authenticator 124. As such, issuer server 116 (including fraud analyzer 122) serves as an intermediary with the user 102, and fraud prevention server 118 (including authenticator 124) serves as an intermediary with backend information systems, such as location monitor 126. Issuer server 116 and fraud prevention server 118 thereby, both individually and in combination, provide increased authentication of user 102 and activity related to resource 104.

Communications interface 306 represents one or more receiver(s), transmitter(s), and transceiver(s) or other communication systems, such that communications maybe transmitted and/or received by issuer server 116 to/from other components of system 100.

As shown in FIG. 3, the received identifiers within communication 128 may be stored within memory 304 as registered user device information 308. For example, identifiers 209 are transmitted from user device 106 via communication 128, and stored within memory 304 as registered user device information 308 as IMSI 310, ICCID 312, IMEI 314, and MSISDN 316. It should thus be appreciated that IMSI 310, ICCID 312, IMEI 314, and MSISDN 316 correspond to IMSI 210, ICCID 212, IMEI 214, and MSISDN 216, respectively. In certain embodiments, a country code 318 may also be transmitted to fraud analyzer 122. However, in certain embodiments, country code 318 is derived from other device information 308, such as the area code within MSISDN 316 or the MCC code within IMSI 310.

Memory 304 is also shown storing resource information 320. Resource information 320 may include, but is not limited to, one or more of a personal account number (PAN) 322 and a bank identification number (BIN) 324. The personal account number 322 is, for example, the card number associated with resource 104.

Fraud analyzer 122, when executed by processor 302, may operate in part to enroll user 102 within issuer server 116. For example, fraud analyzer 122 may implement a hash algorithm 326 based at least on information from within registered user device information 308 and, in certain embodiments, additionally on information within resource information 320. In certain embodiments, hash algorithm 326 may be one-way hash. For example, hash algorithm 326 may be an SHA-* series hash (wherein the * represents a specific SHA-protocol, such as SHA-1, -2, -3, -224 etc.). In embodiments, hash algorithm 326 may be other standard hash algorithms such as MD5, or others known in the art. Herein, it should be appreciated that hash algorithm and hash procedure may be used interchangeably. Implementing said hash algorithm 326 on registered user device information 308 and resource information 320 generates an enrolled user token 328. Additional details on enrolled user token 328 are discussed below. It should be appreciated that aspects of fraud analyzer 122, such as the enrollment process discussed above, may be implemented by other entities in contact with the user 102, and/or user device 106.

Memory 304 may further include location verification 412, confidence level 414, and location alert 416, each of which are discussed in further detail below.

Turning now to FIG. 4, fraud prevention server 118 may include a fraud prevention server processor 402 communicatively coupled with a fraud prevention server memory 404, and a fraud prevention server communications interface 406.

Fraud prevention server processor 402 represents one or more digital processors that execute computer readable instructions stored within memory 404 to implement functionality of fraud prevention server 118 discussed herein.

Fraud prevention server memory 404 may be transitory and/or non-transitory and represents one or more of volatile memory (e.g. RAM) and non-volatile memory (e.g. ROM, FLASH, magnetic media, optical media, and so on). Fraud prevention server memory 404 is shown storing authenticator 124.

Authenticator 124 may comprise computer readable instructions that, when executed by processor 402, enable fraud prevention server 118 to verify the user 102', or the user's device 106', when user 102 travels to second area 112 that is different from the home location (i.e. first area 110) of user 102. Authenticator 124 may utilize enrolled user token 328 and current user token 410 to generate one or more of a location verification 412, confidence level 414, and location alert 416, each of which are discussed in further detail below. In certain embodiments, memory 404 may additionally store resource information 418, including PAN 420 and/or BIN 422 that may be used to generate and/or pair with current user token 410.

In embodiments, enrolled user token 328 of FIG. 4 is the same as enrolled user token 328 shown in FIG. 3 generated by fraud analyzer 122 during enrollment of user 102 within issuer server 116. For example, referring back to FIG. 1, issuer server 116 may transmit via communications interface 306 (FIG. 3) a communication 136, including enrolled user token 328, to fraud prevention server 118 via third communication link 138 between issuer server 116 and fraud prevention server 118. In turn, enrolled user token 328 is received by communications interface 406 of fraud prevention server 118 and stored within memory 404 as enrolled user token 328 for use in authenticating user device 106'. In embodiments, enrolled user token 328 shown in FIG. 4 may differ from enrolled user token 328 shown in FIG. 3. For example, enrolled user token 328 in FIG. 4 may include enrolled user token 328 but be paired with other information, such as resource information 418.

Turning now to FIG. 5, location monitor 126 may include a location monitor processor 502 communicatively coupled with a location monitor memory 504, and a location monitor communications interface 506. In embodiments where location monitor 126 is an integral component of user device 106, processor 502, memory 504, and communications interface 506 correspond to processor 202, memory 204, and communications interface 206, respectively.

Location monitor processor 502 represents one or more digital processors that execute computer readable instructions stored within memory 504 to implement functionality of location monitor 126 discussed herein.

Location monitor memory 504 may be transitory and/or non-transitory and represents one or more of volatile memory (e.g. RAM) and non-volatile memory (e.g. ROM, FLASH, magnetic media, optical media, and so on). Location monitor memory 504 is shown storing device monitor 508.

Device monitor 508 may be computer readable instructions that, when executed by processor 502, enable location monitor 126 to monitor user device 106. For example, device monitor 508 may monitor each of antenna 108 and 114 (as well as other antenna throughout the world) to identify when user device 106 enters second area 112 away from first area 110. Such monitoring function may be passive or active.

For example, referring to FIG. 1, in embodiments where location monitor 126 passively monitors user device 106, location monitor 126 may wait until a location communication 140 is sent from antenna 114 indicating that user device 106' is away from its home area 110. For example, antenna 114 may monitor user device 106, and when user device 106' is turned on, or accesses the network supported by antenna 114 via fourth communication link 142, antenna 114 may transmit location communication 140 to location monitor 126 via fifth communication link 144.

In embodiments where location monitor 126 actively monitors user device 106, location monitor 126 may periodically transmit a location request 146 to one or both of antenna 108 and 114 (as well as other antenna within the network supported by antennas 108, 114) to determine the location of user device 106. The antenna in communication with user device 106 may then respond with a location communication (e.g. communication 140).

In response to receiving location change communication 140, device monitor 508 may transmit request 146, to user device 106, requesting current user device information. In response, user device 106 may transmit to location monitor 126 the user device's current information for storage within memory 504 as current user device information 510. Current user device information 510 requested may match the registered user device information 308 (FIG. 3) used to enroll user device 106 within network 120. For example, current user device information 510 may include IMSI 512, ICCID 514, IMEI 516 and MSISDN 518.

Device monitor 508 may pair one or more pieces of current user device information 510 with resource information 520 stored within memory 504. Resource information 520 may include one or both of PAN 522 and BIN 524. Resource information 520 may be the same information as resource information 320 (FIG. 3). Device monitor 508 may then perform a hash algorithm 526 on at least a portion of the current user device information 510 and, in certain embodiments, additionally at least on a portion of the resource information 520 to generate current user token 410. Current user token 410 is then transmitted, via communications interface 506 to fraud prevention server 118 for storage within memory 404 as current user token 410 shown in FIG. 4. For example, referring back to FIG. 1, current user token 410 may be transmitted as token communication 148. Hash algorithm 526 may be the same as hash algorithm 326 described above. In embodiments, current user token 410 shown in FIG. 4 may differ from current user token 410 shown in FIG. 5. For example, current user token 410 shown in FIG. 4 may include current user token 410 but be paired with other information, such as resource information 418.

It should be appreciated that, in certain embodiments, location monitor 126 may not include resource information 520, hash algorithm 526, or current user token 410, but instead may merely operate to relay current user device information 510 to fraud prevention server 118. In turn, fraud prevention server 118 may perform the hash algorithm 526 and generate current user token 410. In such embodiments, token communication 148 may just include relayed current user device information 510.

In yet another embodiment, token communication 148 may include a benign version of current user token 410. For example, the benign version of current user token 410 includes only information from current user device information 510 that has been subjected to hash algorithm 526.

It should thus be understood that, within the embodiments disclosed herein, various information may be used to generate user token 328, as well as current user token 410.

Accordingly, the tokens described herein could be based on one or more of current (or enrolled) user device information (including one or more of the IMSI, IMEI, ICCID, MSISDN, and country code) and the resource information (including one or both of the PAN and the BIN) subject to a given hash. In embodiments, the tokens generated may be subject to the following constraints:

(1) the tokens generated during enrollment of the user device (e.g. enrolled user token 328) are based on the same information as the current user tokens (e.g. current user token 410); and (2) the tokens generated during enrollment of the user device (e.g. enrolled user token 328) are based on the same hash (or other function, if any) as the current user tokens (e.g. current user token 410).

One such example meeting these constraints is an enrolled token that is based on each of the IMSI 310, ICCID 312, IMEI 314, MSISDN 316, and subjected to hash algorithm 326 which is a SHA-1 hash algorithm to generate enrolled user token 328 which is subsequently transmitted to and stored in memory 404 paired with un-hashed PAN 322. Similarly, the current user token 410 is based on each of IMSI 512, ICCID 514, IMEI 516, MSISDN 518, and subjected to hash algorithm 526 which is the same SHA-1 hash algorithm as hash algorithm 326 and then paired with PAN 420 for storage within memory 404. Authenticator 124 may then compare the enrolled user token 328 and the current user token 410 each of which has been paired with matching PANs.

Another such example meeting these constraints is an enrolled token that is based on each of the IMSI 310, ICCID 312, IMEI 314, MSISDN 316, and PAN 322 subjected to hash algorithm 326 which is a SHA-1 hash algorithm to generate enrolled user token 328 which is then transmitted to and stored in memory 404. Similarly, the current user token 410 is based on each of IMSI 512, ICCID 514, IMEI 516, MSISDN 518, and PAN 522 subjected to hash algorithm 526 which is the same SHA-1 hash algorithm as hash algorithm 326 and then stored within memory 404. Authenticator 124 may then compare the enrolled user token 328 and the current user token 410. This example provides an added level of security in that the user device information and resource information have been blended and hashed together to form the tokens compared by authenticator 124 for authentication of user 102 in second area 112.

Referring back to FIG. 4, authenticator 124 compares enrolled user token 328 to current user token 410 to generate one or more of location verification 412, confidence level 414, and location alert 416. This comparison allows authenticator 124 to determine if the information used to generate enrolled user token 328 and current user token 410 match (at least within a threshold level, in embodiments), thereby confirming that the user device 106 used during enrollment by issuer server 116, and the user device 106 used to generate current user token 410 are the same. This provides a level of security and verification of user 102 within second area 112.

Location verification 412 indicates that the enrolled user token 328 and the current user token 410 match at or above a threshold defining a given level of certainty. It should thus be appreciated that the given level of certainty may be less than perfect (i.e., the enrolled 328 and current 410 user tokens do not necessarily need to be identical) without departing from the scope hereof. In various embodiments, successful location verification 412 can occur only when enrolled user token 328 and the current user token 410 are a perfect match (e.g. the threshold defining a given level of certainty is a 100% match).

Confidence level 414 may indicate how closely matched the enrolled user token 328 is to the current user token 410. In embodiments, confidence level 414 may be a percentage match, such as 98%. In other embodiments, confidence level 414 may be a stepwise match, such as high, medium, or low confidence. It should be appreciated that other stepwise determinations, and other percentages may be utilized without departing from the scope hereof. As such, confidence level 414 may complement location verification 412 such that location verification 412 indicates that there is a match above the threshold, and confidence level 414 indicates a high, medium, or low (or otherwise a percentage) assurance regarding the match in relation to the threshold.

Location alert 416 may indicate that the enrolled user token 328 and the current user token 410 match below the threshold defining the given level of certainty. For example, if the threshold requires a 95% match between the enrolled user token 328 and the current user token 410 to authenticate user 102 (and/or user device 106) within second area 112, then if the match is a 94% match, then the location alert 416 may be generated. In other words, location alert 416 may be generated instead of location verification 412 when there is no match between the current and enrolled user tokens.

Referring back to FIG. 1, one or more of the location verification 412, confidence level 414, and location alert 416 are then transmitted from fraud prevention server 118 to issuer server 116 as authentication communication 150. In turn, as shown in FIG. 3, location verification 412, confidence level 414, and location alert 416 may be stored respectively in memory 304 as location verification 412, confidence level 414, and location alert 416 shown in FIG. 3.

Generation of authentication communication 150, including receipt and comparison of current user token 410 with a previously enrolled user token 328, may be initiated by a variety of situations.

For example, authentication communication 150 may be generated in response to location monitor 126 passively or actively determining that user device 106' has entered second area 112 different from first area 110 which is user's "home location." In such an example, fraud analyzer 122 may make a decision on future transactions using resource 104' within area 112. For example, if location verification 412 is positive, such that the enrolled user token 328 matches the current user token 410 at or above the threshold defining a given level of certainty, fraud analyzer 122 may authorize all future transactions, or all transactions within a given future time period, using resource 104'.

Moreover, if location alert 416 is negative, such that the enrolled user token 328 matches the current user token 410 below the threshold defining a given level of certainty, fraud analyzer 122 may put a temporary hold, or cancel, resource 104'. In such an instance, fraud analyzer 122 may, in embodiments, transmit a prompt to user device 106 that is displayed to user 102 via user interface 218 either as an independent prompt or via issuer application 220.

Further, if confidence level 414 is present, fraud analyzer 122 may utilize confidence level 414 to automatically approve certain transactions with resource 104' within second area 112 based upon the confidence level. For example, if the confidence level 414 is low, then only transactions under $50 may be approved. Or, if the confidence level 414 is high, then a transaction limit may be set to $1,000. It should be appreciated that these transaction limits are for exemplary purposes only and are not limiting in the scope hereof.

Another situation that may initiate generation of authentication communication 150, including receipt and comparison of current user token 410 with a previously enrolled user token 328, is a mobile payment request from user device 106 or 106', regardless of the location (e.g. either first area 110 or second area 112). For example, user device 106 (or user device 106') may request to make a transaction associated with resource 104 via a mobile device payment. At which time, user device 106 may transmit a payment request 154 (see FIG. 1) to fraud prevention server 118. Payment request 154 may be relayed through antenna 108, 114, and through location monitor 126, or directly from the antenna to fraud prevention server 118.

In certain embodiments, prior to fraud analyzer 122 authorizing transactions, canceling transactions, or modifying the user's geo-fence as discussed above, fraud analyzer 122 may transmit prompt 156 to user device 106 requesting user 102 to verify his or her location change. Prompt 156 may also be transmitted to another previously registered user device, such as an e-mail, informing user 102 that the location status has changed. In turn, user interface 218, for example within SDK application 220, may request user 102 to interact with user interface 218 to verify that user 102 changed locations. In certain embodiments, user device 106 may then transmit confirmation/denial 158 to issuer server 116 and thereby issuer server 116 may authorize or deny a transaction, or change the geo-fence, based at least in part on confirmation 158.

Figure 6:
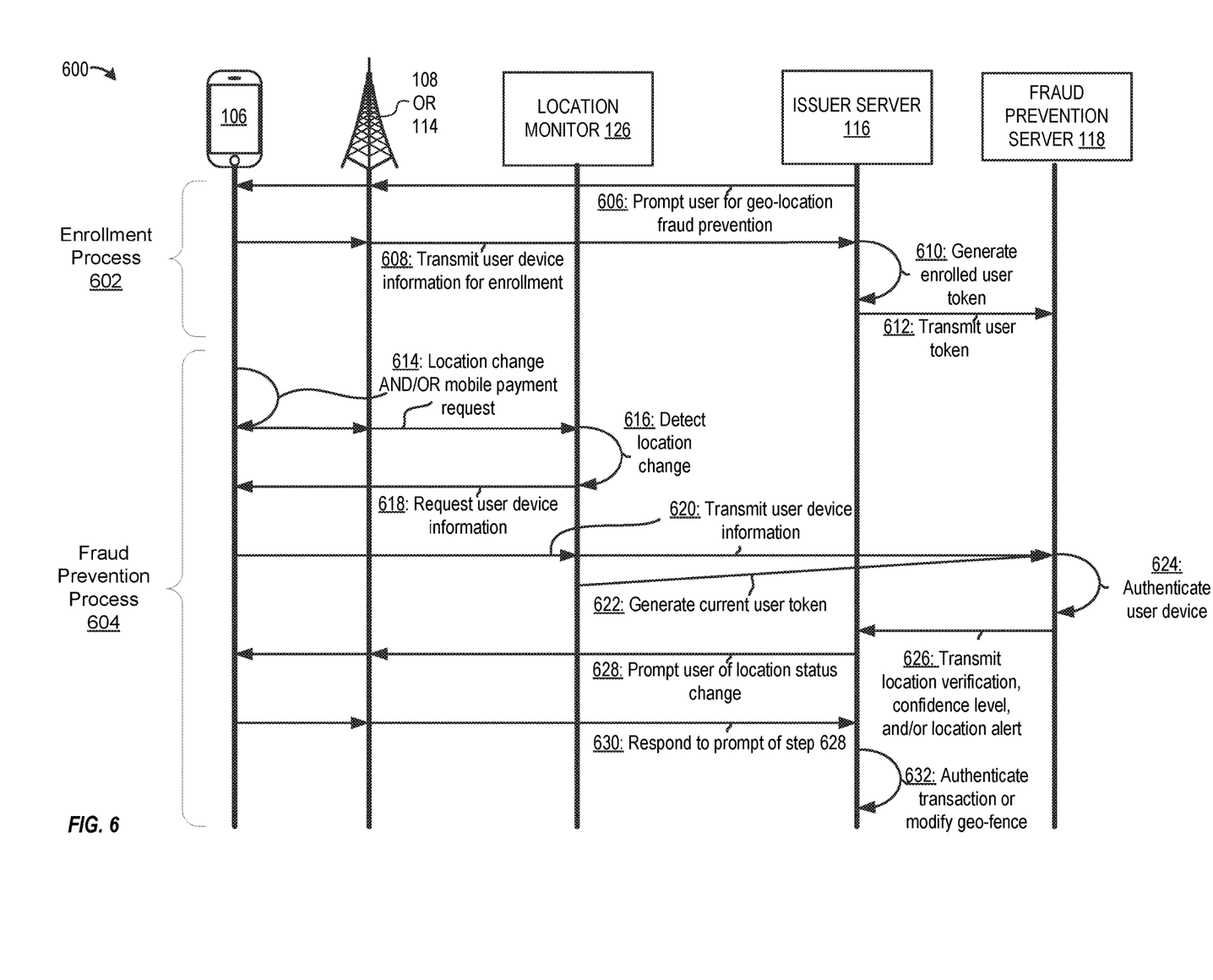
FIG. 6 depicts a flowchart of a method for device fraud prevention, in embodiments.

FIG. 6 depicts a flowchart of a method 600 for device fraud prevention, in embodiments. Method 600 may be implemented using system 100 discussed above with regards to FIGS. 1-5. Shown within method 600 are at least two processes: enrollment process 602, and fraud prevention process 604.

Enrollment process 602 may be implemented using issuer server 116. In step 606 of method 600, a user may be prompted to enroll in geo-location fraud prevention. In one example of step 606, issuer server 116 transmits an enrollment prompt 152 along first and second communication links 132, 134 for display on user device 106 via user interface 218 and issuer application 220. Step 606 is shown transmitting the prompt using antenna 108, however it should be appreciated that user 102 may enroll user device 106 from any location so long as issuer server 116 may verify user 102.

In step 608 of method 600, in response to the prompt of step 606, the user, via the user device, may transmit user device information to the issuer server for enrollment of the user device. In one example of step 608, user device 106 transmits communication 128 via first and second communication links 132, 134 to issuer server 116 including identifiers 209 regarding user device 106. User device information within step 608 may include one or more of IMSI 210, ICCID 212, IMEI 214, MSISDN 216 related to user device 106.

In step 610 of method 600, the issuer server generates an enrolled user token. In one embodiment of step 610, issuer server 116 generates enrolled user token 328 based upon received registered user device information 308 including one or more of IMSI 310, ICCID 312, IMEI 314, and MSISDN 316 as subjected to hash algorithm 326. In such embodiment, enrolled user token 328 may be paired with resource information 320 including one or both of PAN 322 and BIN 324, where only the resource information 320 is subjected to the hash algorithm 326.

In another embodiment of step 610, issuer server 116 generates enrolled user token 328 based upon received registered user device information 308 including one or more of IMSI 310, ICCID 312, IMEI 314, and MSISDN 316 and resource information 320 including one or both of PAN 322 and BIN 324, combined together and subjected to hash algorithm 326.

In step 612, the user token generated in step 610 is transferred from the issuer server to a fraud prevention server. In one example of step 610, issuer server 116 transmits communication 136, including enrolled user token 328, to fraud prevention server 118 via third communication link 138 between issuer server 116 and fraud prevention server 118. Enrolled user token 328 may then be stored within memory 404 as enrolled user token 328.

Accordingly, sub-steps 606, 608, 610, and 612, described above, may constitute enrollment process 602.

Fraud prevention process 604 may occur after enrollment process 602 to monitor location of the user, via user device, and prevent unauthorized transactions using resources associated with the user. For example, fraud prevention process 604 may monitor user device 106 to prevent unauthorized transactions of resource 104 when transactions using resource 104 are located away from first area 110.

In step 614 of method 600, fraud prevention process 604 may be initialized based on a detection of a location change or mobile payment request of the user device. In one example of step 614, user device 106 travels with user 102 from first area 110 to second area 112. In turn, when user device 106' is turned on in second area 112, location monitor passively recognizes that user device 106' is within second area 112 via receipt of communication 140 from user device 106. Under this example of step 614, method 600 may proceed to step 616.

In another example of step 614, user device 106 travels with user 102 from first area 110 to second area 112. In turn, when user device 106' is turned on in second area 112, location monitor actively recognizes that user device 106' is within second area 112 via transmitting location request 146 to user device 106, and receiving communication 140 indicating that user device 106 is outside of first area 110. In certain embodiments, under this example of step 614, method 600 may proceed to step 616. In other embodiments, under this example of step 614, step 614 may be combined with step 620 such that the user device information discussed below during step 620 is transmitted simultaneously with communication 140.

In another example of step 614, user device 106, or 106', transmits mobile payment request 154 to fraud prevention server 118. Mobile payment request 154 may be relayed from user device 106 via antenna 108 either directly to fraud prevention server 118, or through location monitor 126 as an intermediary. Under this example of step 614, method 600 may proceed directly to step 620. In certain embodiments, under this example of step 614, step 614 may be combined with step 620 such that the user device information discussed below during step 620 is transmitted simultaneously with mobile payment request 154.

In step 616, location monitor detects a location change of the user device. In one example of step 616, in response to the passive or active monitoring during step 614, location monitor 126 determines that user device 106 has travelled from first area 110 to second area 112 based upon communication 140.

In step 618 of method 600, a request is sent to the user device to provide user device information. In one example of step 618, location monitor 126 transmits request 146 to user device 106 requesting current user device information.

In step 620 of method 600, the user device may transmit current user device information. In one example of step 620, the user device 106 (or user device 106') transmits current user device information, via antenna 108 or 114, to location monitor 126 for storage therein as current user device information 510. In other examples of step 620, user device 106 (or user device 106') may transmit current user device information to fraud prevention server 118.

In embodiments including step 622 of method 600, a current user token is generated and transmitted to the fraud prevention server. In one example of step 622, location monitor 126 utilizes current user device information 510, including one or more of IMSI 512, ICCID 514, IMEI 516 and MSISDN 518 to generate current user token 410 based on hash algorithm 526, which is the same as hash algorithm 326 used to generate enrolled user token 328. In another example of step 622, location monitor 126 utilizes current user device information current user device information 510, including one or more of IMSI 512, ICCID 514, IMEI 516 and MSISDN 518 and resource information 512 including one or both of PAN 522 and BIN 524, to generate current user token 410 based on hash algorithm 526, which is the same as hash algorithm 326.

If step 620 transmits user device information directly to fraud prevention server 118, step 622 may be performed by fraud prevention server instead of by location monitor 126 as shown in FIG. 6. In either case, the current user token may be stored within fraud prevention server as current user token 410. Moreover, in certain embodiments of step 622 regardless of where the current user token is generated, the current user token may be subject to the following constraints:

(1) the tokens generated during enrollment of the user device (e.g. enrolled user token 328) are based on the same information as the current user tokens (e.g. current user token 410); and
(2) the tokens generated during enrollment of the user device (e.g. enrolled user token 328) are based on the same hash as the current user tokens (e.g. current user token 410).

In step 624 of method 600, the user device is authenticated by the fraud prevention server. In one example of step 624, authenticator 124 of fraud prevention server 118 compares enrolled user token 328 against current user token 410 to determine if the user device 106 is authenticated. Authenticator 124, in response, may generate one or more of location verification 412, confidence level 414, and location alert 416.

In step 626, the location verification, confidence level, and/or location alert are transmitted to the issuer server for use in authenticating transactions related to the user resource. In one example of step 626, location verification 412, confidence level 414, and/or location alert 416 are transferred from fraud prevention server 118 to issuer server 116 and stored thereby as location verification 412, confidence level 414, and location alert 416, shown in FIG. 3, respectively. Issuer server 116 may then utilize such information to verify transactions related to resource 104 (or 104').

In embodiments including step 628 of method 600, the user is prompted of a location status change. In one example of step 628, issuer server 116 transmits prompt 156 to user device 106' requesting user 102' to interact with user interface 218 to verify the location change of user 102 from area 110 to second area 112.

In embodiments including step 630 of method 600, the user interacts with user device in response to the prompt of step 628 and verifies or denies the status change. In one example of step 630, user 102 interacts with user interface 218 of user device 106' to verify or deny location status change. In turn, user device 106 may transmit confirmation/denial 158 to issuer server 116.

Steps 628 and 630 may provide an added level of security by requiring interaction with user 102 in response to a determination of location change in user device 106. This not only requires the current and enrolled tokens to match (or match at or above a threshold degree of certainty), but the user is also notified when a location change is made. Therefore, the user, even if the user's phone information is spoofed by a potential fraudster, is notified of any potential mischievous actions associated with his resource.

In step 632 of method 600, the issuer server may authenticate a transaction, deny a transaction, or modify the geo-fence of the resource. In one example of step 632, issuer server 116 authenticates or denies a transaction, or modifies a geo-fence related to resource 104 based on one or more of location verification, confidence level and/or location alert. In embodiments including steps 628 and 630, the decision in step 632 may further be based on confirmation/denial 158.

In one example of step 632, if location verification 412 is positive, such that the enrolled user token 328 matches the current user token 410 at or above the threshold defining a given level of certainty, fraud analyzer 122 may authorize all future transactions, or all transactions within a given future time period, using resource 104'.

In another example of step 632, if location alert 416 is negative, such that the enrolled user token 328 matches the current user token 410 below the threshold defining a given level of certainty, fraud analyzer 122 may put a temporary hold on, or cancel, resource 104'. In such an instance, fraud analyzer 122 may, in embodiments, transmit a prompt (not shown) to user device 106 that is displayed to user 102 via user interface 218 either as an independent prompt or via issuer application 220 indicating potential fraud. Such prompt may alternatively be transmitted to another device associated with user 102, such as an e-mail account.

In another example of step 623, if confidence level 414 is present, fraud analyzer 122 may utilize confidence level 414 to automatically approve certain transactions with resource 104' within second area 112 based upon the confidence level. For example, if the confidence level 414 is low, then only transactions under $50 may be approved. Or, if the confidence level 414 is high, then a transaction limit may be set to $1,000. It should be appreciated that these transaction limits are for exemplary purposes only and are not limiting in the scope hereof.

It should thus be noted that the matter contained in the above description or shown in the accompanying drawings should be interpreted as illustrative and not in a limiting sense. For example, it should be appreciated that where functions are described above as being implemented via software or computer readable instructions stored within memory, the same functions may be implemented in hardware specifically configured for such functions. The following claims are intended to cover all generic and specific features described herein, as well as all statements of the scope of the present method and system, which, as a matter of language, might be said to fall therebetween.

What is claimed is:

1. A method for device fraud prevention, the method comprising:
   electronically receiving, by a fraud prevention server, an enrolled user token based on registered device information, registered resource information associated with a resource, and a hash procedure;
   electronically storing, by the fraud prevention server, the enrolled user token in memory;
   electronically receiving, by the fraud prevention server, status change information indicative of a status change associated with a user device;
   in response to receiving the status change information, electronically requesting, by the fraud prevention server, a current user token from the user device;
   in response to receiving the current user token from the user device, electronically determining, by the fraud prevention server, whether a difference between the current user token and the enrolled user token is within a predefined threshold by comparing the current user token to the enrolled user token; and
   in response to determining that the difference between the current user token and the enrolled user token is not within the predefined threshold, controlling a remote server to disregard communications from the user device until the difference between the current user token and the enrolled user token is determined to be within the predefined threshold.

2. The method of claim 1, wherein an issuer server performs an initial tokenization, the fraud prevention server is physically sited at a location that differs from the issuer server.

3. The method of claim 1, further comprising:
   electronically, during enrollment of the user device, accessing memory of the user device to perform an initial tokenization of user device information that is stored in the memory of the user device, wherein the initial tokenization electronically converts the user device information into the enrolled user token.

4. The method of claim 3, further comprising:
   electronically, when the user device attempts to electronically access a resource after the enrollment of the user device, accessing the memory of the user device to perform a subsequent tokenization of the user device information, wherein the subsequent tokenization electronically converts the user device information into the current user token.

5. The method of claim 4, wherein the subsequent tokenization electronically converts the user device information into the current user token when a location of the user device changes from a prior area to a current area.

6. The method of claim 4, wherein either the fraud prevention server or a location monitor performs the subsequent tokenization, the location monitor is physically sited at a location that differs from the fraud prevention server.

7. The method of claim 4, wherein the subsequent tokenization is a hash algorithm, the initial tokenization is the hash algorithm.

8. A tangible non-transitory computer-readable storage medium having computer readable instructions that, when executed by an electronic processor, causes the electronic processor to perform a set of operations comprising:
   electronically receiving an enrolled user token based on registered device information, registered resource information associated with a resource, and a hash procedure;
   electronically storing the enrolled user token in memory;
   electronically receiving status change information indicative of a status change associated with a user device;
   in response to receiving the status change information, electronically requesting, a current user token from the user device;
   in response to receiving the current user token from the user device, electronically determining whether a difference between the current user token and the enrolled user token is within a predefined threshold by comparing the current user token to the enrolled user token; and
   in response to determining that the difference between the current user token and the enrolled user token is not within the predefined threshold, controlling a remote server to disregard communications from the user device until the difference between the current user token and the enrolled user token is determined to be within the predefined threshold.

9. A system for device fraud prevention, the system comprising:
   a user device; and
   a fraud prevention server configured to
      electronically receiving an enrolled user token based on registered device information, registered resource information associated with a resource, and a hash procedure,
      electronically storing the enrolled user token in memory,
      electronically receiving status change information indicative of a status change associated with the user device,
      in response to receiving the status change information, electronically requesting, a current user token from the user device,
      in response to receiving the current user token from the user device, electronically determining whether a difference between the current user token and the enrolled user token is within a predefined threshold by comparing the current user token to the enrolled user token, and
      in response to determining that the difference between the current user token and the enrolled user token is not within the predefined threshold, controlling a remote server to disregard communications from the user device until the difference between the current user token and the enrolled user token is determined to be within the predefined threshold.

10. The system of claim 9, wherein the fraud prevention server is electrically connectable to an issuer server in a manner that permits the fraud prevention server to electronically receive the enrolled user token from the issuer server.

11. The system of claim 10, wherein the issuer server is configured to access the memory of the user device to perform the initial tokenization, the fraud prevention server is physically sited at a location that differs from the issuer server.

12. The system of claim 10, wherein, to control the remote server to disregard communication from the user device, the fraud prevention server is configured to electronically transmit authentication information to the remote server.

13. The system of claim 9, wherein user device information that is stored in the memory of the user device is electronically accessible to permit an initial tokenization that converts the user device information into the enrolled user token, the initial tokenization is permissible during an enrollment of the user device.

14. The system of claim 13, wherein the user device information that is stored in the memory of the user device is electronically accessible to permit a subsequent tokenization that converts the user device information into the current user token, the subsequent tokenization is permissible after the enrollment of the user device when the user device attempts to electronically access a resource.

15. The system of claim 14, wherein when a location of the user device changes from a prior area to a current area after the enrollment of the user device, the memory of the user device is electronically accessible to permit the subsequent tokenization of the user device information in a manner that electronically generates the current user token from the user device information.

16. The system of claim 14, wherein the subsequent tokenization is a hash algorithm, the initial tokenization is the hash algorithm.

17. The system of claim 14, wherein either the fraud prevention server is configured to perform the subsequent tokenization.

18. The system of claim 14, wherein the fraud prevention server is electrically connectable to a location monitor in a manner that permits the fraud prevention server to electronically receive the current user token from the location monitor, the location monitor is physically sited at a location that differs from the fraud prevention server.

19. The system of claim 18, wherein the location monitor is configured to perform the subsequent tokenization.

20. The system of claim 18, wherein the location monitor is configured to detect a location change of the user device from a previous area to a current area.

* * * * *